(12) United States Patent
Hosokawa et al.

(10) Patent No.: US 9,871,254 B2
(45) Date of Patent: Jan. 16, 2018

(54) ELECTRODE MATERIAL AND MANUFACTURING METHOD THEREOF

(75) Inventors: Mamoru Hosokawa, Kobe (JP); Satoru Takada, Kobe (JP); Sho Katsura, Kobe (JP); Jun Suzuki, Kobe (JP); Toshiki Sato, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 405 days.

(21) Appl. No.: 14/122,168

(22) PCT Filed: Jun. 14, 2012

(86) PCT No.: PCT/JP2012/065292
§ 371 (c)(1),
(2), (4) Date: Nov. 25, 2013

(87) PCT Pub. No.: WO2012/173213
PCT Pub. Date: Dec. 20, 2012

(65) Prior Publication Data
US 2014/0099544 A1    Apr. 10, 2014

(30) Foreign Application Priority Data

Jun. 16, 2011  (JP) .................................. 2011-133818
Oct. 27, 2011  (JP) .................................. 2011-236097
Apr. 11, 2012  (JP) .................................. 2012-090484

(51) Int. Cl.
*H01M 10/052*   (2010.01)
*H01M 4/66*     (2006.01)
*H01M 4/04*     (2006.01)

(52) U.S. Cl.
CPC ......... *H01M 4/667* (2013.01); *H01M 4/0402* (2013.01); *H01M 4/661* (2013.01); *H01M 4/663* (2013.01); *H01M 10/052* (2013.01)

(58) Field of Classification Search
None
See application file for complete search history.

(56) References Cited

U.S. PATENT DOCUMENTS 6,087,045 A    7/2000  Fauteux et al.
8,221,918 B2   7/2012  Katsura et al.
(Continued)

FOREIGN PATENT DOCUMENTS

CN    102037158 A    4/2011
JP      9 97625       4/1997
(Continued)

OTHER PUBLICATIONS

English translation of JP2009-266466A.*
(Continued)

*Primary Examiner* — Sarah A Slifka
*Assistant Examiner* — Haroon D Sheikh
(74) *Attorney, Agent, or Firm* — Oblon, McClelland, Maier & Neustadt, L.L.P.

(57) ABSTRACT

Provided is an electrode material with excellent tab weldability and realizing decreased contact resistance with an active material layer. A collector (electrode material) (1) is provided with a metal foil substrate (1a) and a carbon-containing conductive substance (1b), and is configured such that, when observed from a square viewfield with a surface area of 0.1 mm², the conductive substance (1b) is arranged in islands on the surface of the substrate (1a) with a 1-80% coverage ratio of the conductive substance (1b) on the surface of the substrate (1a).

9 Claims, 5 Drawing Sheets

(56) References Cited

U.S. PATENT DOCUMENTS

| | | | | |
|---|---|---|---|---|
| 2002/0080558 A1* | 6/2002 | Nonaka | ................... | H01G 9/04 |
| | | | | 361/502 |
| 2004/0161670 A1 | 8/2004 | Kawase et al. | | |
| 2009/0029255 A1 | 1/2009 | Ohmori | | |
| 2010/0297497 A1* | 11/2010 | Takahata | ................ | H01M 4/64 |
| | | | | 429/209 |

FOREIGN PATENT DOCUMENTS

| | | |
|---|---|---|
| JP | 11 288707 | 10/1999 |
| JP | 2000 106332 | 4/2000 |
| JP | 2001 351612 | 12/2001 |
| JP | 2003-249223 A | 9/2003 |
| JP | 2004 207113 | 7/2004 |
| JP | 2007 226969 | 9/2007 |
| JP | 2009 26491 | 2/2009 |
| JP | 2009 266466 | 11/2009 |
| JP | 2010 135338 | 6/2010 |
| JP | 2011 98472 | 5/2011 |

OTHER PUBLICATIONS

Kume, JP 2003-249223, Published Sep. 5, 2003—English Translation Attachment.*
Written Opinion dated Aug. 14, 2012 in PCT/JP12/065292 Filed Jun. 14, 2012.
International Search Report dated Aug. 14, 2012 in PCT/JP12/065292 Filed Jun. 14, 2012.

* cited by examiner

ELECTRODE MATERIAL AND MANUFACTURING METHOD THEREOF

TECHNICAL FIELD

The present invention relates to an electrode material for use in an electrode of a secondary battery and a manufacturing method thereof.

BACKGROUND ART

Many studies have been made by various research institutes on a collector including a carbon-based conductive substance that is applied onto a metal foil such as an aluminum foil or a copper foil used as a substrate of an electrode for a secondary battery. In addition, there have been many patent applications including, for example, PTL1 to PTL4.

PTL1 and PTL2 each describe a collector including a substrate such as an aluminum foil or a copper foil and a coating provided on a surface of the substrate, the coating being formed of fine carbon particles (conductive substance) as conductive substance and a coating-forming compound. PTL3 describes a collector including a conductive layer between the collector and an active material, the conductive layer being formed of carbon powder (conductive substance) and a binder. PTL4 describes a collector having a conductive coating layer on its surface, the conductive coating layer including carbon as a conductive agent. Such techniques are intended to reduce contact resistance between the collector and an active material layer formed on the collector in order to improve high-speed charge-discharge characteristics and cycle characteristics of a battery.

CITATION LIST

Patent Literature

PTL1: Japanese Unexamined Patent Application Publication No. 2007-226969.
PTL2: Japanese Unexamined Patent Application Publication No. 2010-135338.
PTL3: Japanese Unexamined Patent Application Publication No. 9-97625.
PTL4: Japanese Unexamined Patent Application Publication No. 2001-351612.

SUMMARY OF INVENTION

Technical Problem

The configurations of the collectors in the background art described in PTL1 to PTL4 are now collectively described with reference to FIG. 8. FIG. 8 is a schematic sectional diagram for explaining a configuration of a collector in a background art. As illustrated in FIG. 8, a collector 3 in the background art includes a conductive substance layer 3b that is uniformly provided on each surface of a substrate 3a formed of a metal foil. Specifically, the entire surface of the substrate 3a is covered with the conductive substance layer 3b.

As illustrated in FIG. 8, when a conductive substance layer 3b is uniformly formed on each surface of the substrate 3a, and when an undepicted metal tab, which is to electrically connect the collector 3 to a battery terminal, is then welded to the surface of the collector 3 in order to fabricate a battery using the collector 3, the conductive substance layer 3b disturbs the welding, leading to degradation in weldability.

Furthermore, since the conductive substance layer 3b is uniformly provided on the surface of the substrate 3a with a certain thickness, the total thickness of the collector 3 is increased due to such a conductive substance layer 3b. In the case where an electrode, which includes the collector 3 and an undepicted active substance layer stacked on the collector 3, is used in a battery, the thickness of the undepicted active substance layer on the collector 3 is disadvantageously limited if the collector 3 is accommodated in a battery having a constant volume.

An object of the present invention, which has been made in light of the above-described problem, is to provide an electrode material that has excellent weldability to a tab, and achieves low contact resistance between the electrode material and an active material layer, and provide a method of manufacturing the electrode material.

Solution to Problem

The present invention provides an electrode material and a manufacturing method of the electrode material as described below.

(1) An electrode material, characterized by including a substrate formed of a metal foil and conductive substance containing carbon provided on a surface of the substrate, wherein when the conductive substance is observed in a square visual field having an area of 0.1 mm$^2$, the conductive substance is disposed in islands at a coverage ratio of 1 to 80% on the surface of the substrate.

According to such a configuration, the conductive substance is provided on the surface of the substrate formed of a metal foil at a coverage ratio of 80% or less; hence, 20% or more of the surface is not covered with the conductive substance, and plain metal is thus exposed in such an uncovered surface portion. As a result, for example, when the electrode material is used for a collector of an electrode of a lithium-ion secondary battery, and when a metal tab, which is to connect the collector to a battery terminal, is welded to the collector, the metal tab is excellently welded to the exposed plain metal. Moreover, since the conductive substance covers the surface of the substrate at a coverage ratio of 1% or more, for example, when the electrode material is used for a collector of an electrode of a lithium-ion secondary battery, contact resistance between the collector and the active material layer stacked on the collector is reduced.

(2) The electrode material according to (1), characterized in that part of the conductive substance is buried in the substrate, and a maximum height of the conductive substance from the surface of the substrate is 3 μm or less.

According to such a configuration, part of the conductive substance is buried in the substrate, thereby leading to improvement in adhesion and an increase in contact area between the substrate and the conductive substance. Moreover, since the height of the conductive substance from the surface of the substrate is 3 μm or less, a thin-film electrode material is achieved. Here, "the surface of the substrate" refers to a surface of the substrate, below which no conductive substance is buried, and "the height of the conductive substance from the surface of the substrate" refers to a height of an apex of the conductive substance with reference to a surface position of the substrate at which no conductive substance is buried. Moreover, "maximum height of the conductive substance" refers to a value determined as follows: 20 visual fields of the substrate are observed at ×2000 in a sectional direction of the substrate to obtain heights of all island carbon sites contained in the photographed visual fields, and the average of the obtained carbon heights is added to the standard deviation ($\sigma$) thereof, and thus the value is determined.

(3) The electrode material according to (1), characterized in that a deposition amount per unit area of the conductive substance on the substrate is 0.05 to 0.50 $g/m^2$.

(4) The electrode material according to (2), characterized in that a deposition amount per unit area of the conductive substance on the substrate is 0.05 to 0.50 $g/m^2$.

According to such a configuration, the deposition amount is 0.50 $g/m^2$ or less, thus allowing excellent welding of the metal tab etc. to the electrode material. Moreover, the deposition amount is 0.05 $g/m^2$ or more, and thus when the electrode material is used as a collector of an electrode of a lithium-ion secondary battery, contact resistance between the collector and the active material layer stacked on the collector is reduced.

(5) A manufacturing method of the electrode material according to (1), characterized by including in sequence an application step of applying a solution containing the conductive substance onto the surface of the substrate, and a drying step of drying the solution, wherein the conductive substance is aggregated in the solution before or after application of the solution onto the surface of the substrate.

According to such a method, in the application step, the solution containing the conductive substance is applied onto the surface of the substrate while the conductive substance is aggregated before or after the application, and therefore the conductive substance in the solution applied onto the surface of the substrate is disposed in islands on the surface of the substrate. The solution is then dried in the drying step, so that the conductive substance is fixed to the surface of the substrate.

(6) The manufacturing method of the electrode material according to (5), characterized in that, in the application step, the solution containing 0.1 to 7 mass % of carbon powder having an average particle size of 0.01 to 1 μm is applied onto the surface of the substrate.

According to such a method, the conductive substance is preferably aggregated in the solution before or after application of the solution onto the substrate, so that the conductive substance is disposed in islands on the surface of the substrate.

(7) The manufacturing method of the electrode material according to (5), characterized by further including a pressure bonding step or a rolling step after the drying step, the pressure bonding step allowing the conductive substance to be attached to the substrate, and the rolling step allowing the substrate to be rolled.

(8) The manufacturing method of the electrode material according to (6), characterized by further including a pressure bonding step or a rolling step after the drying step, the pressure bonding step allowing the conductive substance to be attached to the substrate, and the rolling step allowing the substrate to be rolled.

According to such a method, the conductive substance disposed in islands on the surface of the substrate tightly adheres to the substrate by the pressure bonding or the rolling, and part of the conductive substance is buried into the substrate.

(9) A manufacturing method of the electrode material according to (1), characterized by including in sequence an application step of uniformly applying a solution containing the conductive substance onto the surface of the substrate to form a conductive substance layer, a drying step of drying the solution, and a rolling step of rolling the substrate.

According to such a method, the conductive substance layer formed on the surface of the substrate in the application step is dried in the drying step, and is thus fixed to the surface of the substrate. While the substrate is rolled and extended in the rolling step, the conductive substance layer cannot follow the elongation of the metal-foil substrate, and is eventually broken into pieces. Consequently, the conductive substance is disposed in islands on the surface of the rolled substrate.

Advantageous Effects of Invention

According to the electrode material according to the present invention, the conductive substance is disposed in islands on the surface of the metal foil as a substrate, and a coverage ratio of the conductive substance is limited so that a plain metal foil is partially exposed in the surface of the electrode material, thereby making it possible to reduce contact resistance of the electrode material and secure excellent weldability to a tab etc.

According to the electrode material according to the present invention, improvement in adhesion and an increase in contact area between the substrate and the conductive substance are achieved, thus allowing a further reduction in contact resistance of the electrode material. In addition, since the thickness of the electrode material is limited, the amount of the active material layer per unit volume is not significantly limited.

According to the electrode material according to the present invention, an appropriate deposition amount of conductive substance is disposed on the surface of the substrate, thus making it possible to secure excellent weldability to a tab etc. and reduce contact resistance of the electrode material.

According to the manufacturing method of an electrode material according to the present invention, an electrode material, which includes a substrate and conductive substance disposed in islands on the surface of the substrate, can be manufactured.

According to the manufacturing method of the electrode material according to the present invention, the electrode material, which includes a substrate and conductive substance that is more preferably disposed in islands on the surface of the substrate, can be manufactured.

According to the manufacturing method of the electrode material according to the present invention, adhesion between the substrate and the conductive substance is improved, and part of the conductive substance is buried into the substrate, thus making it possible to manufacture an electrode material further reduced in contact resistance.

According to the manufacturing method of the electrode material according to the present invention, the conductive substance layer is broken into pieces through rolling of the substrate to form an island structure, thus making it possible to reduce limitation in particle size of the conductive substance and limitation in concentration range of a conductive material in a solution containing the conductive substance to be applied.

DESCRIPTION OF EMBODIMENTS

Figure 1:
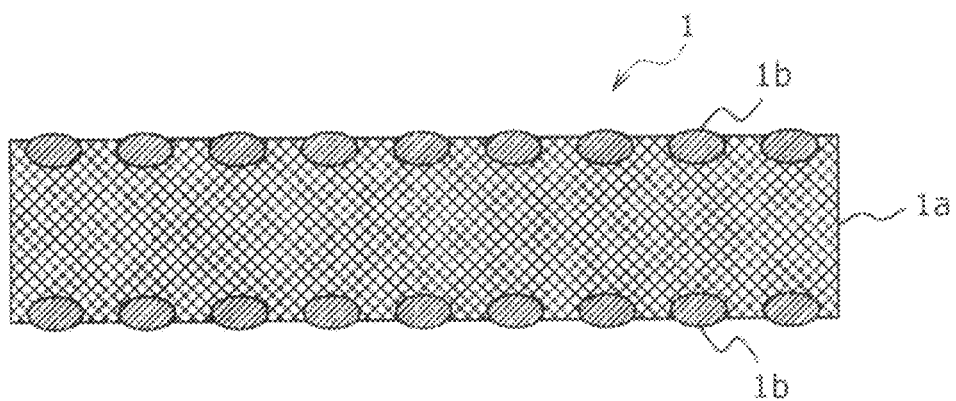
FIG. 1 is a schematic sectional diagram for explaining a structure of a collector according to the present invention.

An embodiment of an electrode material (hereinafter, referred to as collector) are now described in detail.
[Structure of Collector]

A structure of the collector according to this embodiment is described in detail with reference to FIG. 1.

The collector (electrode material) 1 according to this embodiment is configured of a substrate 1$a$ formed of a metal foil and conductive substance 1$b$ disposed in islands on a surface of the substrate 1$a$. The conductive substance 1$b$ is disposed on each side of the substrate 1$a$. The conductive substance 1$b$, however, may be disposed on one side of the substrate 1$a$.

Herein, "island" refers to a state where the conductive substance 1$b$ is disposed to allow part of the surface of the substrate 1$a$ to be not covered with the conductive substance 1$b$, i.e., to be exposed. For example, as illustrated in FIG. 1, a plurality of aggregates of the conductive substance 1$b$ may be disposed separately from one another, or may be bonded to one another so as to be reticularly disposed.

For example, the collector 1 according to this embodiment can be preferably used as a collector of an electrode of a lithium-ion secondary battery. The electrode using the collector 1 is described later.

The collector 1 is made into a structure where when the conductive substance 1$b$ is observed in a square visual field having an area of 0.1 mm$^2$, the conductive substance 1$b$ is disposed in islands on the surface of the substrate 1$a$, thereby when the collector 1 is used for an electrode of a battery, and when an undepicted metal tab, which electrically connects the collector 1 to a battery terminal, is welded to the collector 1, weldability to the tab can be improved.

When the conductive substance 1$b$ is observed in a square visual field having an area of 0.1 mm$^2$, the coverage ratio of the conductive substance 1$b$ on the surface of the substrate 1$a$ is 1 to 80%. The coverage ratio is preferably 5% or more, more preferably 10% or more, and most preferably 30% or more. In addition, the coverage ratio is preferably 75% or less, more preferably 70% or less, and most preferably 60% or less. If the coverage ratio of the conductive substance 1$b$ is 1% or more, contact resistance between the collector 1 and an active material layer (see FIG. 2), which is stacked on the surface of the collector 1 to be used for an electrode of a secondary battery, can be reduced compared with a case of using a simple Al foil having no conductive substance 1$b$ thereon. Moreover, the coverage ratio of the conductive substance 1$b$ on surface of the substrate 1$a$ is 80% or less, which secures excellent weldability to a tab.

The coverage ratio of 1 to 80% is given in observation in a region having a sufficiently small area compared with area of a portion to be welded with a tab; hence, islands of the conductive substance 1$b$ are evenly disposed on the surface of the substrate 1$a$ at least in units of such observation area.

For example, the coverage ratio of the conductive substance 1$b$ on the surface of the substrate 1$a$ can be determined as follows: a surface of a prepared sample is photographed with a scanning electron microscopy (SEM), and coverage area of carbon powder contained in the photographed visual field on the substrate surface is calculated through image processing to determine the coverage ratio.

The deposition amount per unit area of the conductive substance 1$b$ on the substrate 1$a$ is preferably within a range of 0.05 to 0.50 g/m$^2$, and more preferably within a range of 0.08 to 0.40 g/m$^2$.

The deposition amount per unit area of the conductive substance 1$b$ on the substrate 1$a$ can be determined as follows. First, a solution containing the conductive substance 1$b$ is applied onto the substrate 1$a$ and is dried to prepare a sample, and mass of the sample is measured. The conductive substance 1$b$ is then wiped off from the sample surface with water or alcohol, and mass of the sample, from which the conductive substance 1$b$ is removed, is measured. A difference in mass of the sample between before and after the removal of the conductive substance 1$b$ is divided by area of the sample, and thus the deposition amount per unit area of the conductive substance 1$b$ on the substrate 1$a$ can be calculated.

Although the conductive substance 1$b$ may be deposited on the surface of the substrate 1$a$, the conductive substance 1$b$ may be partially buried into the substrate 1$a$ as illustrated in FIG. 1. Such a structure can be formed by application of the conductive substance 1$b$ onto the surface of the substrate 1$a$, and then performing pressure bonding or rolling on the collector 1. The structure improves adhesion between the substrate 1$a$ and the conductive substance 1$b$, and increases contact area therebetween. Consequently, contact resistance between the collector 1 and an active material layer 2 (see FIG. 2) can be further reduced. In addition, since the conductive substance 1$b$ is pressed, the thickness of the collector 1 can be reduced.

To reduce the thickness of the electrode using the collector 1, the conductive substance 1$b$ disposed on the surface of the substrate 1$a$ formed of the metal foil desirably has a maximum height of 3 μm or less from the surface of the substrate 1$a$. The height of the conductive substance 1$b$ is 3 μm or less, and thus the electrode does not have excessively large thickness. This eliminates need of significant limitation in application amount of the active material layer 2 (see FIG. 2) stacked on the collector 1, and consequently capacity of the lithium-ion secondary battery is prevented from being significantly reduced. The maximum height is more preferably 2 μm or less. The lower limit of the maximum height is zero since the conductive substance 1$b$ may be completely buried as long as low resistance is exhibited.

(Substrate)

The substrate 1$a$ may be formed of metal such as aluminum (Al) or copper (Cu) that is generally used as an electrode material for a secondary battery. In the case where the substrate 1$a$ is used as the electrode material for a secondary battery, the substrate 1$a$ is typically used in a form of a foil having a thickness of about 5 to 50 μm. In the case where the rolling step is performed in the manufacturing method of the collector according to this embodiment, the process may be performed in such a manner that a solution containing the conductive substance 1b is applied onto the substrate 1a in a form of a plate or thick foil and is then dried, and then the substrate 1a is reduced in thickness through rolling.

In the case where the substrate 1a is used for an electrode, usable materials of the substrate 1a may include various pure metals and alloys thereof suitable for use environment of the electrode without being limited to materials having particular compositions such as Al and Cu.
(Conductive Substance)

When the conductive substance 1b is observed in a square visual field having an area of 0.1 mm$^2$, the conductive substance 1b is disposed in islands so as to cover 1 to 80% of the surface of the substrate 1a to reduce the contact resistance between the active material layer 2 (see FIG. 2) and the collector 1 configured of the conductive substance 1b and the substrate 1a.

Carbon-based conductive materials may be used as the conductive substance 1b. As the carbon-based conductive materials, natural or artificial crystalline graphite, expanded graphite, artificial graphite, pyrolytic graphite, and various types of carbon black may be used.
(Electrode)

A configuration of an electrode of a lithium-ion secondary battery using the collector 1 according to this embodiment is now described with reference to FIG. 2.

Figure 2:
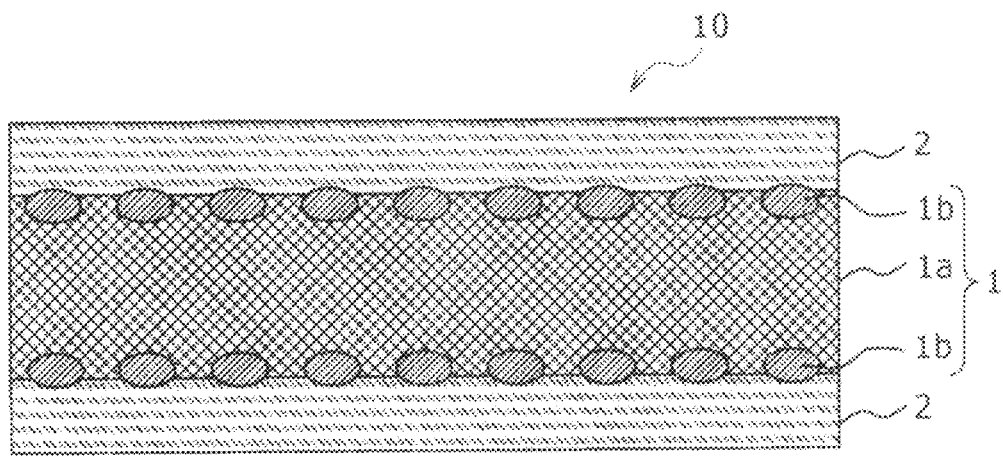
FIG. 2 is a schematic sectional diagram for explaining a structure of an electrode using the collector according to the invention.

An electrode 10 illustrated in FIG. 2 is configured of the collector 1 according to this embodiment and the active material layer 2 stacked on each surface (each of two sides) of the collector 1. In the case where a positive electrode of the lithium-ion secondary battery is formed, metals such as Al and Al alloys can be used for the collector 1. Various known materials, including, for example, lithium-containing oxides such as $LiCoO_2$, $LiNiO_2$, and $LiMn_2O_4$, may be used as a positive-electrode active material. A preparation process of the active material layer 2 for the positive electrode may include various known processes without limitation. For example, the active material layer 2 can be prepared as follows: a binder and other necessary materials such as a conductive material and a solvent are added to the powdered lithium-containing oxide, such a mixture is then sufficiently kneaded and is then applied onto the collector 1 and dried, and then the collector 1 is pressed to prepare the active material layer 2. The active material layer 2 may be stacked on the conductive substance 1b provided on one side of the collector 1.

In the case where a negative electrode of the lithium-ion secondary battery is formed, metals such as Cu, Cu alloys, nickel (Ni), Ni alloys, and stainless steel can be used for the collector 1. For example, graphite-based carbon materials can be used as a negative-electrode active material. The active material layer 2 for the negative electrode can be prepared by a process similar to the preparation process of the active material layer 2 for the positive electrode.

The manufacturing method of the collector 1 according to this embodiment is now described.
[Manufacturing Method]

Several manufacturing methods may be used for fabrication of the collector 1 having a structure where the conductive substance 1b is disposed in islands on the surface of the substrate 1a formed of a metal foil. Such manufacturing methods are described in order.

First Embodiment

A first Embodiment of the manufacturing method of the collector 1 is now described with reference to (a) of FIG. 3 (and FIG. 1 as necessary).

In the first Embodiment of the manufacturing method of the collector 1, a solution containing the conductive substance 1b is applied onto the surface of the substrate 1a formed of a metal foil and is then dried, thereby the collector 1 is manufactured.

Figure 3:
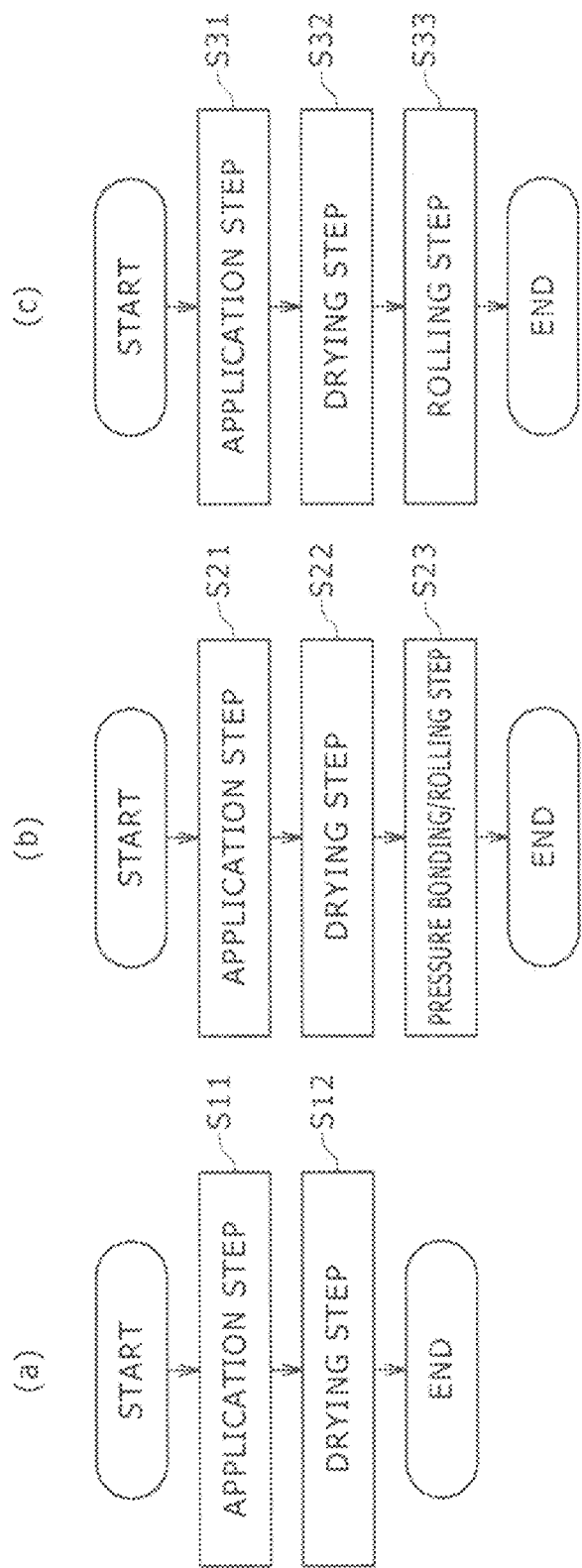
FIG. 3 includes flowcharts illustrating a flow of a manufacturing method of the collector according to the invention, where (a) is a flowchart of a process of a first Embodiment, (b) is a flowchart of a process of a second Embodiment, and (c) is a flowchart of a process of a third Embodiment.

In the case where a structure, in which the conductive substance 1b is disposed in islands on the surface of the substrate 1a, is formed only through application, the collector 1 can be fabricated by a manufacturing method as illustrated in (a) of FIG. 3, the manufacturing method including an application step S11 in which a solution containing the conductive substance 1b is applied onto the surface of the substrate 1a, and the conductive substance 1b is aggregated in the solution before or after application of the solution onto the surface of the substrate 1a, and a drying step S12 of drying the solution.

The conductive substance 1b is uniformly dispersed in the solution immediately after preparation of the solution, but is gradually aggregated with the lapse of time. Specifically, the conductive substance 1b is aggregated before or after application of the prepared solution onto the surface of the substrate 1a. This leads to a state where the conductive substance 1b is aggregated in islands in the solution applied onto the surface of the substrate 1a. The solution is then dried so that the conductive substance 1b is fixed in islands to the surface of the substrate 1a.

The application step S11 is now described in detail.
(Application Step)

The particle size and the concentration of the conductive substance 1b are effectively adjusted to aggregate the conductive substance 1b into an ideal island structure. Along with adjustment of each of the particle size and the concentration, viscosity of the solution is varied, and application performance and distribution of the dried conductive substance 1b are accordingly varied. In the case of using carbon powder as the conductive substance 1b, the solution desirably contains 0.1 to 7 mass % (preferably 0.5 to 5 mass %) of carbon powder having an average particle size of 0.01 to 1 μm (preferably 0.02 to 0.5 μm). The average particle size is 0.01 μm or more, and the concentration is 7 mass % or less. Such a state prevents an excessive increase in viscosity of the solution, and in turn prevents formation of an excessively large aggregate of the carbon powder, thus achieving the ideal island structure. In addition, the average particle size of the carbon powder as the conductive substance 1b is 1 μm or less, and the carbon concentration is 0.1 mass % or more. Such a state ensures formation of the island structure, and secures a sufficient number of contacts between the carbon powder as the conductive substance 1b and the metal foil as the substrate 1a, which advantageously leads to a reduction in contact resistance between the collector 1 and the active material layer 2 (see FIG. 2).

For example, water, toluene, N-methylpyrrolidone, various aqueous solutions, and various organic solvents can be used as a solvent of the solution for excellent aggregation of the conductive substance 1b. In addition, a generally used thickener and/or fluorine resin, for example, various types of resin such as carboxymethylcellulose, polyvinylidene fluoride, styrene-butadiene rubber, and polypropylene, may be added.

Carbon-based materials can be used as the conductive substance 1b. Specifically, natural or artificial crystalline graphite, expanded graphite, artificial graphite, pyrolytic graphite, and various types of carbon black may be used.

The solution containing the conductive substance 1b can be applied onto the surface of the substrate 1a by any one of generally used application processes with various coaters such as a bar coater, a roll coater, a gravure coater, a dip coater, and a spray coater. The conductive substance 1b is applied onto each side or one side of the substrate 1a.
(Drying Step)

A drying step S12 is now described.

The drying step S12 is to evaporate the solvent after the application step S11. The drying step S12 may be performed at room temperature, or may be performed through heating using a heat treatment furnace etc., as necessary.

Second Embodiment

A second Embodiment of the manufacturing method of the collector 1 is now described with reference to (b) of FIG. 3 (and FIG. 1 as necessary).

As illustrated in (b) of FIG. 3, in the second Embodiment of the manufacturing method of the collector 1, a pressure bonding step or a rolling step (pressure bonding/rolling step S23) is further performed after the application step S21 and the drying step S22 in the first Embodiment of the manufacturing method. In other words, the collector 1 fabricated by the first Embodiment of the manufacturing method is further subjected to pressure bonding or rolling.
(Application Step and Drying Step)

The application step S21 and the drying step S22 are similar to the application step S11 and the drying step S12, respectively, in the first Embodiment of the manufacturing method. The collector 1, in which the conductive substance 1b is disposed in islands on the surface of the metal foil as the substrate 1a, is formed through the application step S21 and the drying step S22.
(Pressure Bonding Step or Rolling Step)

Following the drying step S22, the collector 1 is further subjected to pressure bonding or rolling (pressure bonding/rolling step S23) so that the conductive substance 1b is pressed and is partially buried into the substrate 1a. This allows the collector 1 to be further reduced in thickness compared with the collector 1 fabricated only through the application step S11 and the drying step S12. Furthermore, this allows improvement in adhesion of the conductive substance 1b to the substrate 1a, and allows an increase in contact area between the substrate 1a and the conductive substance 1b.

Any of various rolling mills or rolling presses can be used for a process of the pressure bonding or rolling. In the second Embodiment, "pressure bonding" refers to reduction at a rolling reduction on the substrate 1a of substantially zero, and "rolling" refers to reduction at a rolling reduction on the substrate 1a of more than zero. In the case where the rolling is performed, rolling reduction is preferably 20% or less.

For example, when the collector 1 is used as a collector of an electrode of a lithium-ion secondary battery, the thickness of the active material layer 2 (see FIG. 2) stacked on the surface of the collector 1 is not limited since the collector 1 is reduced in thickness. As a result, capacity of the lithium-ion secondary battery is not reduced. Moreover, contact resistance between the collector 1 and the active material layer 2 can be further reduced due to the improvement in adhesion and the increase in contact area between the substrate 1a and the conductive substance 1b.

Third Embodiment

A third Embodiment of the manufacturing method of the collector 1 is now described with reference to (c) of FIG. 3 (and FIG. 1 as necessary).

As illustrated in (c) of FIG. 3, the third Embodiment of the manufacturing method of the collector 1 sequentially performs an application step S31 in which a solution containing the conductive substance 1b is applied in a layer onto the surface of the metal foil as the substrate 1a to form the conductive substance layer, a drying step S32 of drying the conductive substance layer, and a rolling step S33 in which, following the drying of the conductive substance layer, the metal foil is rolled so as to be plastically deformed to produce a structure where the conductive substance 1b is disposed in islands on the surface of the metal foil.
(Application Step)

First, in the application step S31, the solution containing the conductive substance 1b is uniformly applied onto the surface of the substrate 1a. As a result, the collector 1, on which a conductive substance layer as a layer of the conductive substance 1b is stacked while uniformly covering the surface of the substrate 1a, is formed.
(Drying Step)

Subsequently, in the drying step S32, the solution containing the conductive substance 1b, which has been applied onto the surface of the substrate 1a, is dried, thereby the collector 1, in which the conductive substance layer is fixed to the surface of the substrate 1a, is formed. The drying step S32 may be performed at room temperature, or may be performed through heating using a heat treatment furnace.
(Rolling Step)

In the rolling step S33, the metal foil as the substrate 1a, to which the conductive substance layer is fixed, is rolled, but the conductive substance layer fixed onto the metal foil cannot follow the elongation of the metal foil, and is eventually broken into pieces. As a result, a structure, in which the conductive substance 1b is disposed in islands on the metal foil as the substrate 1a, is formed.

Since the island structure of the conductive substance 1b is formed in the rolling step S33, the particle size and the concentration of the conductive substance 1b may each be large compared with that in each of the first and second Embodiments of the manufacturing method. Specifically, in the case where carbon powder is used as the conductive substance 1b, the particle size of the conductive substance 1b may be 0.01 to 20 μm, and the concentration of the solution to be applied may be 0.1 to 50 mass %.

Moreover, in the rolling step S33, rolling reduction is appropriately adjusted depending on particle size, concentration, and an application amount of carbon powder to be applied, thereby a coverage ratio of the conductive substance 1b on the surface of the rolled substrate 1a can be adjusted within a range of 1 to 80%.

Any of various known rolling mills or rolling presses can be used for a process of the rolling.

Through the rolling step S33, a reduction in thickness of the conductive substance 1b and improvement in adhesion of the conductive substance 1b to the substrate 1a can each be achieved at a level equal to or higher than a level of that in the case of performing the pressure bonding step S23.

For example, when the collector 1 is used as a collector of an electrode of a lithium-ion secondary battery, the active material layer 2 (see FIG. 2) stacked on the surface of the collector 1 is not limited in thickness since the collector 1 is reduced in thickness. As a result, capacity of the lithium-ion secondary battery is not reduced. Moreover, contact resistance between the collector 1 and the active material layer 2 can be further reduced due to the improvement in adhesion between the substrate 1a and the conductive substance 1b.

EXAMPLE

The collector of the above-described embodiment is now described while comparing an Example that satisfies the requirements of the invention with a comparative example that does not satisfy the requirements of the invention.

Samples were prepared according to the following procedure.

(Al Substrate)

In the case of using Al for the substrate, 1000-series Al alloy was used. With thickness of the Al foil, an Al foil 15 μm in thickness was used for samples to be not reduced and samples to be lightly reduced (pressure-bonded). For samples subjected to heavy reduction (rolling), Al foils having different thicknesses were appropriately used so as to each have a thickness of 15 μm after rolling, and a solution containing carbon powder as the conductive substance was applied onto each Al foil and was dried, and then the Al foil was rolled.

(Cu Substrate)

In the case of using Cu for the substrate, a 99.99% pure copper foil was used. The used Cu foil had a thickness of 20 μm.

(Conductive Substance)

Carbon powder (Acetylene Carbon Black from STREM CHEMICALS Inc. (sample Nos. 1 to 7 and 10) and SNE-6G Expanded Graphite from SEC CARBON, LIMITED) (sample Nos. 8 and 9)) was used as the conductive substance.

(Application Step)

In the application step, water was used as a solvent containing the conductive substance, and carboxymethylcellulose (CMC) (Wako Pure Chemical Industries, Ltd.) resin was added in a concentration of 1 mass %. The solution was applied using a bar coater (bar No. 5).

(Drying Step)

The solution containing the conductive substance was applied onto the surface of the substrate, and then the substrate was held and dried at room temperature.

(Pressure Bonding Step or Rolling Step)

In the rolling step, rolling was performed using a skin pass roll having a roll diameter φ of 100 mm.

Rolling reduction was calculated by Formula (1) after measurement by a micrometer of thicknesses of a sample (the foil and the conductive substance) before and after the rolling.

(Calculation of Rolling Reduction)

The thickness of the sample before rolling was represented as t0, and the thickness thereof after rolling was represented as t1, and the rolling reduction was calculated by Formula (1).

(Rolling reduction)=$((t0-t1)/t0) \times 100(\%)$     Formula (1)

In the pressure bonding step, pressure bonding was performed using the skin pass roll as described above. In the case of pressure bonding, the rolling reduction was 0% (i.e., the thickness of the substrate was not varied).

In the application step, the bar No. of the bar coater used for application of the solution containing the conductive substance was varied to prepare samples (sample Nos. 17 to 23) in which values of the deposition amount per unit area of the conductive substance on the substrates were different from one another. Such samples were prepared by the same procedure except that different numbers of bars for the bar coater were used in the application step (Nos. 2 to 7 bars were used for sample Nos. 17 to 23, respectively).

[Evaluation Method]

(Evaluation of Coverage Ratio)

To determine the coverage ratio of the conductive substance (carbon), the surface of each of the resultant samples was photographed at ×300 with the field-emission-type scanning electron microscope (FE-SEM) SU-70 from Hitachi, Ltd., and coverage area of carbon powder contained in a photographed visual field on a substrate surface was calculated through image processing.

(Evaluation of Weldability 1)

In evaluation of first weldability (weldability (1)), ten samples, in each of which the conductive substance (carbon) was provided on each side of an Al or Cu foil 15 μm in thickness, were stacked, and were subjected to spot welding under a certain pressure, and if eight or more samples were welded to one another, such ten samples were determined to be good, and if seven or less samples were welded to one another, such ten samples were determined to be bad. The welding was performed with spot welder HSW-02A from Yokodai.JP at a voltage of 25 V and for a current application time of 500 μsec.

(Evaluation of Weldability 2)

In evaluation of second weldability (weldability (2)), ten samples, in each of which the conductive substance (carbon) was provided on each side of an Al foil 15 μm in thickness, were stacked, and an Al foil 30 μm in thickness and an Al foil 250 μm in thickness were attached on the respective top and bottom of the stack. In this state, the samples were subjected to ultrasonic welding under a certain pressure from upper and lower sides, and if eight or more samples were welded to one another, such ten samples were determined to be good, and if seven or less samples were welded to one another, such ten samples were determined to be bad. The welding was performed with ultrasonic welder MH2026/CLF2500 from Sonobond Ultrasonics, Inc. at a condition of pressure of 0.28 MPa, output power of 400 W, and energy of 20 J and for a current application time of 70 μsec.

Evaluation of the weldability was performed on one of the weldability (1) with spot welding and the weldability (2) with ultrasonic welding.

(Evaluation of Contact Resistance)

A sample was sandwiched from two sides thereof by two carbon cloths, and was further sandwiched from respective outer sides of the carbon cloths by two copper electrodes with a contact area of 1 cm$^2$. While a load of 1 kgf (9.8 N) was applied between the copper electrodes to pressurize the sample, a current of 7.4 mA was applied therebetween using a direct-current power supply, and a voltage applied between the carbon cloths was measured by a voltage meter. The contact resistance was calculated based on the above-described current value, contact area, and measured voltage. Similar measurement was performed on the substrate itself. If a sample had a contact resistance lower than that of the substrate itself, the sample was determined to be effectively reduced in contact resistance. A simple Al foil as a substrate had a contact resistance of 500 [mΩ·cm$^2$]. A simple Cu foil as another substrate had a contact resistance of 100 [mΩ·cm$^2$].

(Evaluation of Internal Resistance of Battery)

An active material layer was formed on a sample (collector), which includes an Al foil as the substrate and the conductive substance (carbon) provided on one side of the substrate, to prepare a positive electrode for a lithium-ion secondary battery. LiCiO$_2$, acetylene black, polyvinylidene fluoride (PVdF), and N-methylpyrrolidone (NMP) were used as an active material, a conductive aid, a binder, and a solvent, respectively. Such materials were mixed at a predetermined ratio into a slurry. The slurry was applied onto a sample surface on which the conductive substance was provided, and was then dried in the air at 120° C., thereby an active material layer 25 μm in thickness was formed.

According to a procedure similar to that of the above-described sample preparation, a slurry containing graphite as an active material was applied onto a Cu foil about 15 μm in thickness, and was then dried to prepare a negative electrode for a lithium-ion secondary battery. The negative electrode was combined with the above-described positive electrode to prepare a battery cell for measurement of internal resistance of a battery.

The fabricated battery cell was subjected to predetermined conditioning charge-and-discharge processing, and was then subjected to measurement of discharge curves obtained after the battery cell was discharged at various currents from a charged state of 4.2 V at different discharge rates. A current value versus a voltage value at a discharge capacity of 1 mAh in each discharge curve was plotted, and the internal resistance of the battery cell was calculated based on the inclination of a straight line obtained by such plotting.

A substrate including a simple Al foil, which had a thickness of 15 μm and had no conductive substance thereon, was used as a collector, and a positive electrode was prepared as with any other sample. A battery cell was also prepared using the positive electrode. This battery cell was subjected to measurement of discharge curves as with battery cells using other samples to calculate internal resistance. If a sample had an internal resistance lower than that of the battery cell prepared using the collector including only the substrate, the sample was determined to be effectively reduced in internal resistance. A battery cell, which was prepared using the simple Al foil being the substrate as the collector, had an internal resistance of 45Ω.

(Evaluation of Maximum Height)

To determine the maximum height of the conductive substance (carbon), a cross section of a sample was processed using a cross section processor (Cross Section Polisher (CP) SM-09010 from JEOL Ltd.), and then 20 visual fields of the sample were observed at ×2000 in a sectional direction of the sample with the field-emission-type scanning electron microscope (FE-SEM) SU-70 from Hitachi, Ltd., and heights of all island carbon sites contained in the photographed visual fields (assuming that a substrate surface portion having no carbon was a reference surface) were calculated through image processing. The average of the calculated carbon heights was added to the standard deviation (σ) thereof, and the resultant value was determined as the maximum height. The reason for performing such statistical processing is as follows: even if a slight number of carbon particles have large heights, characteristics of the collector are not affected thereby; hence, such extreme values are intentionally excluded. The value determined through such statistical processing substantially corresponds to the maximum height.

(Evaluation of Deposition Amount)

The deposition amount per unit area of the conductive substance on the substrate was determined according to the following procedure. In this Example, the deposition amount per unit area on the substrate refers to deposition amount per unit area on one side of the substrate.

First, a solution containing the conductive substance was applied onto the substrate and was dried to prepare a sample, and mass of the sample was measured. The conductive substance was then wiped off from the sample surface with water or alcohol. Mass of the sample, from which the conductive substance 1b was removed, was measured. A difference in mass of the sample between before and after the removal of the conductive substance was divided by area of the substrate, thereby the deposition amount per unit area of the conductive substance on the substrate was calculated.

An Al or Cu foil having a size of 50 mm square (i.e., an area of 2500 mm$^2$) was used as the substrate (i.e., sample).

Tables 1 to 3 show lists of evaluation results of characteristics and determination results of the quality of the prepared samples.

In the determination results in Tables 1 to 3, "∘" represents "good", and "x" represents "bad". In Tables 1 to 3, each value determined to be bad is underlined.

TABLE 1

| No. | Particle size (μm) | Concentration (mass %) | Coverage ratio (%) | Weldability (1) (the number of samples) | Weldability (2) (the number of samples) | Contact resistance (mΩ·cm$^2$) | Internal resistance (Ω) | Maximum height (μm) | Rolling/pressure bonding | Determination |
|---|---|---|---|---|---|---|---|---|---|---|
| 1 | 0.05 | 0.05 | <u>0.5</u> | 10 | — | <u>500</u> | — | 1 | — | x |
| 2 | 0.05 | 0.3 | 5 | 10 | — | 300 | — | 1.2 | — | ∘ |
| 3 | 0.05 | 0.5 | 10 | 10 | — | 250 | — | 1.5 | — | ∘ |
| 4 | 0.05 | 1 | 50 | 8 | — | 210 | — | 2 | — | ∘ |
| 5 | 0.05 | 6 | 75 | 8 | — | 190 | — | 3 | — | ∘ |
| 6 | 0.05 | 8 | <u>87</u> | <u>0</u> | — | 180 | — | 5 | — | x |
| 7 | 0.05 | 8 | <u>92</u> | <u>0</u> | — | 110 | — | 3 | Rolling (20%) | x |
| 8 | 3 | 15 | 70 | 8 | — | 270 | — | 0.9 | Rolling (50%) | ∘ |
| 9 | 3 | 15 | 30 | 8 | — | 250 | — | 0.8 | Rolling (80%) | ∘ |
| 10 | 0.05 | 0.5 | 10 | 10 | — | 230 | — | 1 | Pressure bonding | ∘ |
| 11 | 0.05 | 0.5 | 15 | — | 10 | 220 | 32 | 1.6 | — | ∘ |
| 12 | 0.05 | 1.5 | 55 | — | 8 | 200 | 31 | 2.2 | — | ∘ |
| 13 | 0.05 | 8.5 | <u>89</u> | — | <u>0</u> | 170 | 30 | 5 | — | x |
| 14 | 0.1 | 1 | 56 | 8 | — | 120 | 27 | 1.3 | — | ∘ |
| 15 | 0.01 | 1 | 40 | 8 | — | 400 | 42 | 2.2 | — | ∘ |
| 16 | 0.05 | 0.04 | <u>0.5</u> | 10 | — | <u>500</u> | <u>45</u> | 1 | — | x |

TABLE 2

| No. | Particle size (μm) | Concentration (mass %) | Coverage ratio (%) | Weldability (1) (the number of samples) | Weldability (2) (the number of samples) | Contact resistance (mΩ·cm²) | Internal resistance (Ω) | Maximum height (μm) | Rolling/pressure bonding | Deposition amount (g/m²) | Determination |
|---|---|---|---|---|---|---|---|---|---|---|---|
| 17 | 0.05 | 1 | 0.7 | 10 | — | 500 | — | 1 | — | 0.04 | x |
| 18 | 0.05 | 1 | 11 | 10 | — | 240 | — | 1.5 | — | 0.09 | ○ |
| 19 | 0.05 | 1 | 33 | 10 | — | 230 | — | 1.7 | — | 0.17 | ○ |
| 20 | 0.05 | 1 | 50 | 8 | — | 210 | — | 2 | — | 0.32 | ○ |
| 21 | 0.05 | 1 | 70 | 8 | — | 200 | — | 2.2 | — | 0.37 | ○ |
| 22 | 0.05 | 1 | 78 | 8 | — | 190 | — | 2.5 | — | 0.48 | ○ |
| 23 | 0.05 | 1 | 85 | 0 | — | 180 | — | 2.5 | — | 0.60 | x |

TABLE 3

| No. | Substrate | Particle size (μm) | Concentration (mass %) | Coverage ratio (%) | Weldability (1) (the number of samples) | Weldability (2) (the number of samples) | Contact resistance (mΩ·cm²) | Internal resistance (Ω) | Maximum height (μm) | Rolling/pressure bonding | Deposition amount (g/m²) | Determination |
|---|---|---|---|---|---|---|---|---|---|---|---|---|
| 24 | Cu | 0.05 | 0.05 | 0.5 | 10 | — | 100 | — | 0.5 | — | 0.03 | x |
| 25 | Cu | 0.05 | 0.5 | 4 | 10 | — | 70 | — | 1.0 | — | 0.09 | ○ |
| 26 | Cu | 0.05 | 1 | 24 | 10 | — | 40 | — | 1.3 | — | 0.15 | ○ |
| 27 | Cu | 0.05 | 1 | 28 | 10 | — | 37 | — | 1.2 | — | 0.19 | ○ |
| 28 | Cu | 0.05 | 1 | 35 | 9 | — | 34 | — | 1.5 | — | 0.21 | ○ |
| 29 | Cu | 0.05 | 2 | 53 | 9 | — | 37 | — | 1.8 | — | 0.38 | ○ |
| 30 | Cu | 0.05 | 5 | 74 | 8 | — | 32 | — | 2.0 | — | 0.47 | ○ |
| 31 | Cu | 0.05 | 10 | 88 | 2 | — | 31 | — | 2.1 | — | 0.56 | x |

As illustrated in Table 1, No. 1 shows a case where carbon powder as the conductive substance in the solution has an average particle size of 0.05 μm and a concentration of 0.05 mass % (i.e., 0.1 mass % or less). In this case, the coverage ratio of the carbon was small; hence, weldability (weldability (1) with spot welding) was excellent, but the reduction effect of contact resistance was not found compared with the case of the substrate including the simple Al foil.

No. 6 shows a case where carbon powder as the conductive substance in the solution containing the conductive substance in the application step has an average particle size of 0.05 μm and a concentration of 8 mass %. Since the concentration of the carbon powder was high, the coverage ratio of the carbon powder also had a high value, i.e., 87%. In this case, a reduction effect of contact resistance was found compared with the case of the substrate including the simple Al foil, but weldability (weldability (1)) was not excellent due to the high coverage ratio of the carbon powder.

In No. 2 to No. 5, carbon powder as the conductive substance in the solution in each sample had an average particle size of 0.05 μm, and respective concentrations of the carbon powder were 0.3 mass %, 0.5 mass %, 1 mass %, and 6 mass % (i.e., within a range of 0.1 to 7 mass %), and each sample was prepared while a coverage ratio of the carbon powder as the conductive substance on the surface of the Al foil as the substrate was within a range of 1 to 80%. In each sample, excellent weldability (weldability (1)) and a reduction in contact resistance were achieved.

In No. 7, carbon powder as the conductive substance in the solution had an average particle size of 0.05 μm and a concentration of 8 mass %, and the sample was subjected to light reduction (rolling at rolling reduction of 20%). Since the coverage ratio of the carbon powder on the surface of the Al foil was high, i.e., 92%, weldability (weldability (1)) was not excellent. While the coverage ratio was able to be adjusted by rolling reduction, the rolling reduction was too small for application of the solution having a concentration of 8 mass %.

In each of No. 8 and No. 9, carbon powder as the conductive substance in the solution has an average particle size of 3 μm and a high concentration of 15 mass %, and the sample was rolled with heavy reduction (at rolling reductions of 50% and 80%, respectively). The respective coverage ratios of carbon on the surfaces of the Al foils were 70% and 30%, i.e., within the range of 1 to 80%. In this case, excellent weldability (weldability (1)) and a reduction effect of contact resistance were found.

In No. 10, carbon powder as the conductive substance in the solution had an average particle size of 0.05 μm and a concentration of 0.5 mass % (i.e., within a range of 0.1 to 7 mass %), and the sample was subjected to pressure bonding (light reduction at a rolling reduction of 0%). An island structure of carbon was formed through application of the solution, and excellent weldability (weldability (1)) and a reduction effect of contact resistance were achieved due to the pressure bonding.

In No. 11 and No. 12, carbon powder as the conductive substance in the solution in each sample had an average particle size of 0.05 μm, and respective concentrations of the carbon powder were 0.5 mass % and 1.5 mass % (i.e., within the range of 0.1 to 7 mass %), and each sample was prepared while a coverage ratio of the carbon powder as the conductive substance on the surface of the Al foil as the substrate was within the range of 1 to 80%. In each sample, excellent weldability (weldability (2) with ultrasonic welding) and a reduction in contact resistance were achieved, and internal resistance was also reduced.

No. 13 shows a case where carbon powder as the conductive substance in the solution has an average particle size of 0.05 μm and a concentration of 8.5 mass %. Since the concentration of the carbon powder was high, the coverage ratio of the carbon powder also had a high value, i.e., 89%. In this case, a reduction effect of contact resistance and a reduction effect of internal resistance were found compared with the case of the substrate including the simple Al foil, but weldability (weldability (2)) was not excellent due to the high coverage ratio of the carbon powder.

In No. 14 and No. 15, respective average particle sizes of carbon powder as the conductive substance in the solution were 0.1 μm and 0.01 μm, and the carbon powder in each sample had a concentration of 1 mass % (i.e., within the range of 0.1 to 7 mass %), and each sample was prepared while a coverage ratio of the carbon powder as the conductive substance on the surface of the Al foil as the substrate was within the range of 1 to 80%. In each sample, excellent weldability (weldability (1)) and a reduction in contact resistance were achieved, and internal resistance was also reduced.

No. 16 shows a case where carbon powder as the conductive substance in the solution has an average particle size of 0.05 μm and a concentration of 0.04 mass %. Since the concentration of carbon powder was low, the coverage ratio of the carbon powder also had a low value, i.e., 0.5%. In this case, weldability (weldability (1)) was excellent compared with the case of the substrate including the simple Al foil, but a reduction effect of contact resistance and a reduction effect of internal resistance were not found.

Table 2 shows evaluation results of samples having different values of deposition amount per unit area (hereinafter, simply referred to as deposition amount) of the conductive substance on the substrate. As shown in Table 2, as the coverage ratio of the conductive substance increased, the deposition amount also increased.

In sample No. 17, the deposition amount was low, i.e., 0.04 g/m², and the coverage ratio was also low, i.e., less than 1%. Hence, the reduction effect of contact resistance was not found compared with the case of the substrate including the simple Al foil.

In sample No. 23, the deposition amount was high, i.e., 0.60 g/m², and therefore a large reduction effect of contact resistance was achieved, but weldability (weldability (1)) was not excellent due to a high coverage ratio.

In a range of the deposition amount values of samples No. 18 to No. 22, excellent results were obtained on contact resistance and weldability (weldability (1)).

Table 3 shows evaluation results in the case of using a Cu foil as the substrate. In the case of using the Cu foil as the substrate, as the coverage ratio of the conductive substance increased, the deposition amount also increased. In sample No. 24, each of the coverage ratio and the deposition amount was below the range specified in the present invention; hence, the reduction effect of contact resistance was not found compared with the case of the substrate including the simple Cu foil. In sample No. 31, the deposition amount was high, i.e., 0.56 g/m², and therefore a large reduction effect of contact resistance was achieved, but weldability (weldability (1)) was not excellent due to a high coverage ratio.

In a range of the deposition amount of samples No. 25 to No. 30, excellent results were obtained on contact resistance and weldability (weldability (1)).

[Observation Results with SEM]

Figure 4:
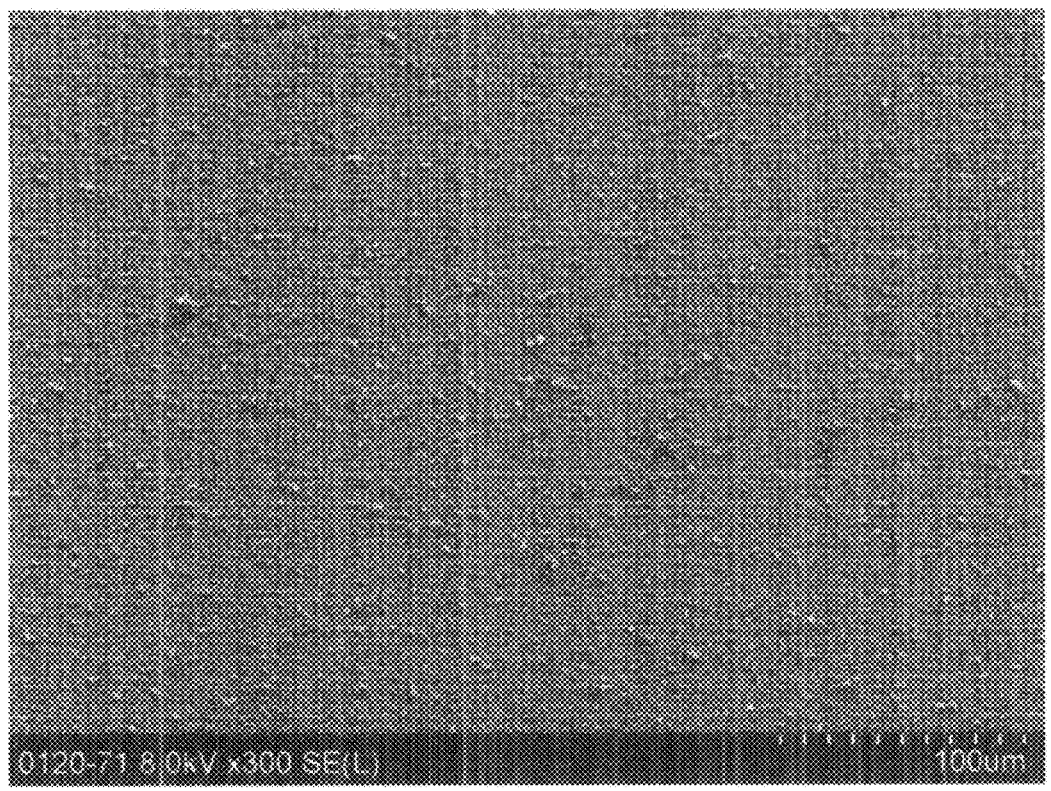
FIG. 4 is a photograph taken by a scanning electron microscope of a surface of a sample of the collector according to an Example.

FIG. 4 shows results of observation with a scanning electron microscope (SEM) on a surface of a sample of a collector prepared by application of carbon powder as the conductive substance. A solution, having an average particle size of carbon powder of 0.05 μm and a carbon concentration of 1 mass %, was used as the solution containing the conductive substance (carbon) to be applied. The observation results with SEM on the sample surface revealed that aggregates of the carbon powder as the conductive substance were deposited in islands on the surface of the Al foil, and thus part of the surface of the Al foil was not covered with carbon, i.e., exposed. In FIG. 4, one scale unit shown in the lower right represents 10 μm.

Figure 5:
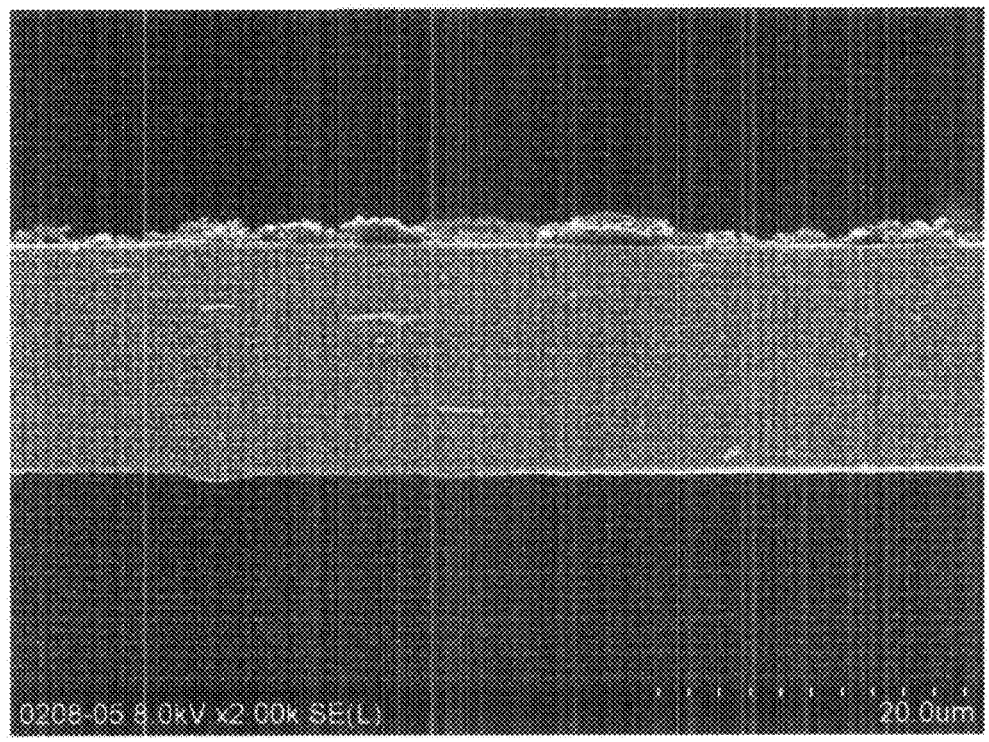
FIG. 5 is a photograph taken by a scanning electron microscope of a cross section of the sample of the collector according to the Example.

FIG. 5 shows results of observation with SEM on a cross section of a sample of a collector prepared by application of carbon powder as the conductive substance. The preparation condition of the sample was similar to that of the sample illustrated in FIG. 4. It was revealed that the conductive substance having a thickness of about 2 μm was deposited in islands. In FIG. 5, one scale unit shown in the lower right represents 2 μm.

Figure 6:
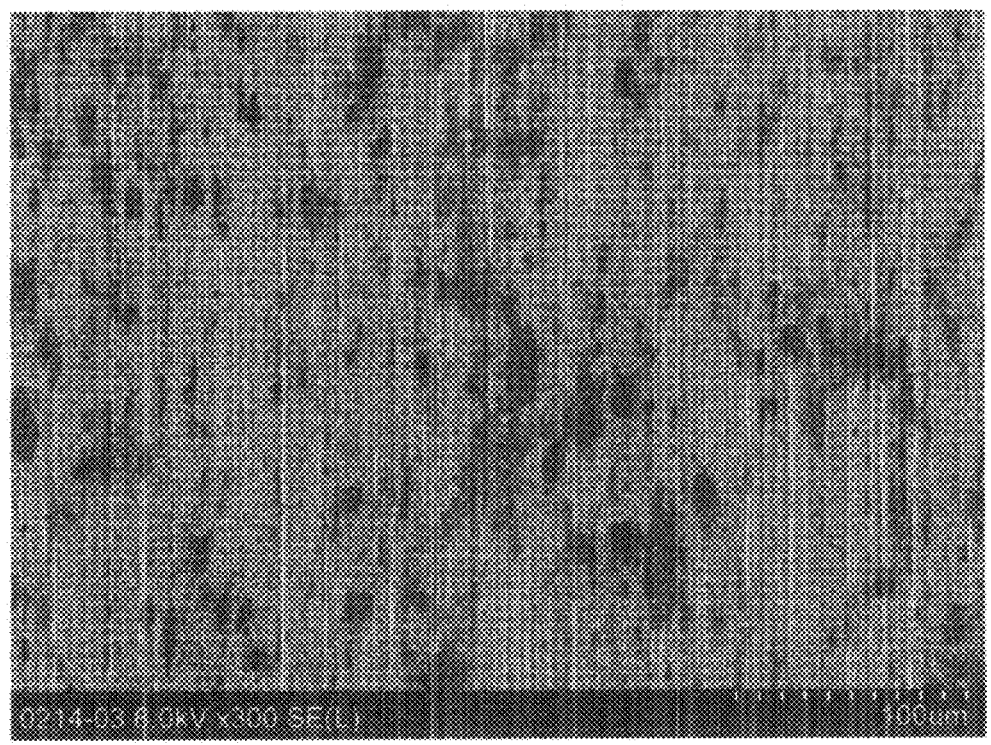
FIG. 6 is a photograph taken by a scanning electron microscope of a surface of a sample of a collector according to another Example.
Figure 7:
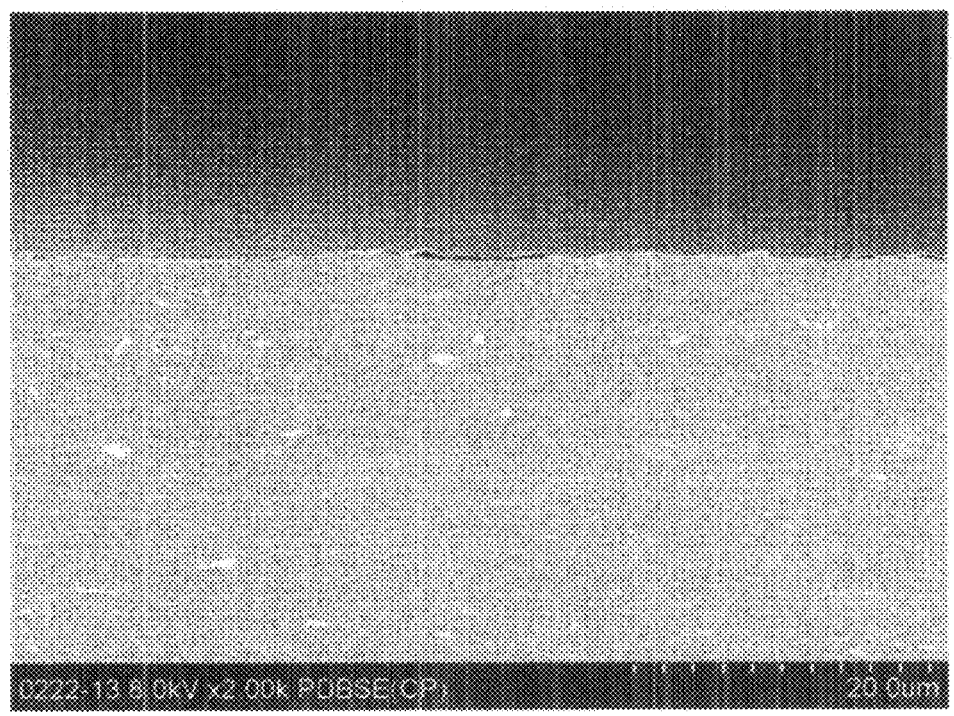
FIG. 7 is a photograph taken by a scanning electron microscope of a cross section of the sample of the collector according to such another Example.
Figure 8:
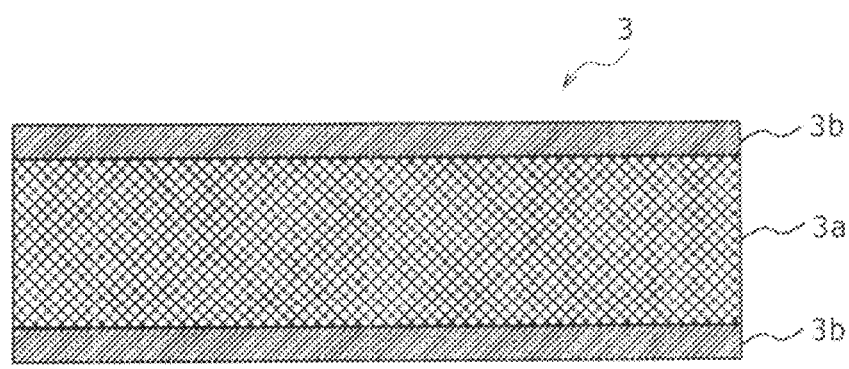
FIG. 8 is a schematic sectional diagram for explaining a structure of a collector according to a background art.

FIGS. 6 and 7 show results of observation with SEM on a surface and a cross section, respectively, of a sample that was prepared as follows: carbon powder having an average particle size of 3 μm was used as the conductive substance, and a conductive substance solution having a carbon concentration of 13 mass % was applied onto a surface of an Al foil and was dried, and then the Al foil was rolled at a rolling reduction of 80% to prepare the sample. It was revealed that the conductive substance was disposed in islands on the surface of the Al foil, and was reduced in thickness compared with a sample prepared only through application and drying. In FIG. 6, one scale unit shown in the lower right represents 10 μm. In FIG. 7, one scale unit shown in the lower right represents 2 μm.

Although the application has been described in detail with reference to a particular embodiment, it should be understood by those skilled in the art that various alterations and modifications thereof may be made without departing from the spirit and the scope of the invention.

The present application is based on Japanese patent application (JP-application No. 2011-133818) filed on Jun. 16, 2011, Japanese patent application (JP-application No. 2011-236097) filed on Oct. 27, 2011, and Japanese patent application (JP-application No. 2012-90484) filed on Apr. 11, 2012, the content of each of which is hereby incorporated by reference.

INDUSTRIAL APPLICABILITY

According to the electrode material according to the present invention, the conductive substance is disposed in islands on the surface of the metal foil as a substrate, and a coverage ratio of the conductive substance is limited so that a plain metal foil is partially exposed in the surface of the electrode material, thereby making it possible to reduce contact resistance of the electrode material and secure excellent weldability to a tab etc.

According to the electrode material according to the present invention, improvement in adhesion and an increase in contact area between the substrate and the conductive substance are achieved, thus allowing a further reduction in contact resistance of the electrode material. In addition, since the thickness of the electrode material is limited, the amount of the active material layer per unit volume is not significantly limited.

According to the electrode material according to the present invention, an appropriate deposition amount of conductive substance is disposed on the surface of the substrate, thus making it possible to secure excellent weldability to a tab etc. and reduce contact resistance of the electrode material.

According to the manufacturing method of an electrode material according to the present invention, an electrode material, which includes a substrate and conductive substance disposed in islands on the surface of the substrate, can be manufactured.

According to the manufacturing method of the electrode material according to the present invention, the electrode material, which includes a substrate and conductive substance that is more preferably disposed in islands on the surface of the substrate, can be manufactured.

According to the manufacturing method of the electrode material according to the present invention, adhesion between the substrate and the conductive substance is improved, and part of the conductive substance is buried into the substrate, thus making it possible to manufacture an electrode material further reduced in contact resistance.

According to the manufacturing method of the electrode material according to the present invention, the conductive substance layer is broken into pieces through rolling of the substrate to form an island structure, thus making it possible to reduce limitation in particle size of the conductive substance and limitation in concentration range of a conductive material in a solution containing the conductive substance to be applied.

REFERENCE SIGNS LIST 1 collector (electrode material)
1a substrate
1b conductive substance
2 active material layer
10 electrode

The invention claimed is:

1. A manufacturing method of an electrode material comprising a substrate and a conductive substance, the method comprising:
  applying a solution comprising the conductive substance which comprises carbon onto a surface of the substrate formed of a metal foil, and
  subsequently drying the solution,
  wherein
  the solution comprises from 0.1 to 7 mass % of carbon powder having an average particle size of from 0.01 to 1 μm,
  the conductive substance is aggregated in the solution before or after applying the solution onto the surface of the substrate,
  a deposition amount per unit area of the conductive substance on the substrate is from 0.05 to 0.50 g/m$^2$, and
  when the conductive substance is observed in a square visual field having an area of 0.1 mm$^2$, the conductive substance is disposed in islands at a coverage ratio of from 1 to 80% on the surface of the substrate.

2. The method of claim 1, further comprising:
  after the drying, pressure bonding to allow the conductive substance to be attached to the substrate, or rolling the substrate.

3. The method of claim 1, further comprising:
  after the drying, pressure bonding to allow the conductive substance to be attached to the substrate.

4. The method of claim 1, further comprising:
  after the ding, rolling the substrate.

5. The method of claim 2, wherein at least a part of the conductive substance is buried in the substrate, and a maximum height of the conductive substance from the surface of the substrate is 3 μm or less.

6. The method of claim 2, wherein the conductive substance is completely buried in the substrate.

7. The method of claim 1, wherein the substrate is formed of aluminum or copper.

8. The method of claim 1, wherein the solution comprises from 0.5 to 5 mass % of carbon powder.

9. The method of claim 1, wherein the carbon powder has an average particle size of from 0.02 to 0.5 μm.

* * * * *